United States Patent Office 3,448,005
Patented June 3, 1969

3,448,005
PROCESS OF FORMING WET STRENGTH PAPER CONTAINING A CATIONIC RESIN AND FUMARATED UNSATURATED OIL
Cecil Jay Allison, Jr., Paul Y. Jone, and Paul E. Jacobson, Seattle, Wash., assignors to Weyerhaeuser Company, Tacoma, Wash., a corporation of Washington
No Drawing. Filed Jan. 4, 1965, Ser. No. 423,371
Int. Cl. D21h 3/58; D21d 3/00
U.S. Cl. 162—164                                    3 Claims

ABSTRACT OF THE DISCLOSURE

Wet strength paper and a method of making the same wherein a water-soluble, cationic, thermosetting resin is first added to an aqueous suspension of cellulosic fibers followed by the addition of an anionic material which contains reactive carboxyl or sulfonic acid groups. The suspension is then formed into a paper sheet and the sheet dried at elevated temperatures to partially cure the cationic resin.

---

This invention is concerned with the process of treating paper-making fibers to improve the wet strength of the paper products made therefrom. The invention is particularly directed to improving the efficiency with which certain thermosetting resins confer wet strength to paper products formed from cellulosic fibers. The invention is also directed to the improved wet strength in the paper products.

A cationic thermosetting polyalkylene polyamine modified urea-formaldehyde resin or aliphatic polyamide base resin partially reacted with a polyfunctional cross-linking agent is used as the actual wet strengthening agent. According to the invention, certain anionic additives are employed to reinforce the wet strengthening characteristics of a cationic resin.

The paper industry has for a considerable time been using thermosetting resins to increase the wet strength properties of paper products, and such resins have been incorporated in paper in a variety of ways. In early efforts the paper was passed through a vat of resin or the resin solution was applied directly to the paper by spraying.

In other processes anionic resins, in water-soluble form, were mixed with a cellulosic fiber slurry before sheet formation. After acidification of the slurry sufficient resin was retained on the fibers to provide subsequent wet strength. While this process provided some wet strength, it was wasteful because of poor resin retention on the fibers.

In the most recent processes, cationic water dispersible resins having a positive charge on the molecule are dispersed in the fiber slurry. Because of a positive charge the resins are specifically attracted to and held by the negatively charged cellulosic fibers. This process substantially reduces the resin lost in the white water. A number of such resins are used by the paper industry, the exact choice being dependent on many factors. Specific production equipment, the exact type of paper being produced, economic consideration, and other factors all enter into the choice.

It is an object of this invention to increase the wet strength of paper made by incorporating into the pulp slurry up to about 2% of the dry weight of the fiber on a resin solids basis either cationic thermosetting polyalkylene polyamine modified urea-formaldehyde resins or cationic thermosetting aliphatic polyamide base resins partially reacted with a polyfunctional cross-linking agent by adding additional anionic additives which contain reactive carboxyl or sulfonic acid groups to the fiber slurry after the addition of the cationic resins to the slurry. These anionic materials are alkali metal or ammonium salts of fumarated, unsaturated oils, sulfonated urea-formaldehyde resins, alkali metal or ammonium lignin sulfonates and alkali metal salts of phenolic acids derived from bark, and are added in an amount between about 0.05% and about 2%, preferably between about 0.05% and 0.2%, based on the dry weight of the fiber. After the addition of the anionic material, the sheet is formed and dried with concomitant curing of the resin contained therein. The invention also has as an object the providing of wet strength in paper products by incorporating therein the above cationic thermosetting resins in an amount up to about 2% of resin solids based on the dry fiber weight and the above anionic resins in an amount between about 0.05% and about 2% based on the dry fiber weight.

The cationic thermosetting polyalkylene polyamine modified urea-formaldehyde resins include resins in which all or part of the formaldehyde is replaced with paraformaldehyde and these latter resins are included within the term "urea-formaldehyde resins." The amine modifiers include diethylene triamine and triethylene tetramine and mixtures of various similar polyalkylene polyamines.

The aliphatic polyamide base resin of the other cationic thermosetting resin can be made by reacting a polyalkylene polyamine with an aliphatic saturated dicarboxylic acid such as adipic, malonic, succinic, and azelaic acid. The thus formed aliphatic polyamide base resin is then partially reacted with a polyfunctional cross-linking agent such as epichlorohydrin, the reaction product of epichlorohydrin and ammonia, ethylene dichloride, and the like.

The anionic alkali metal or ammonium salts of fumarated unsaturated oils are prepared by first reacting an oil such as soy or linseed with fumaric acid to form an alkyd-type reaction product which is then reacted with an alkali metal hydroxide in water solution or with ammonium hydroxide. The resulting salt is water-soluble and anionic in nature.

The anionic sulfonated urea resins are generally prepared by first reacting crystalline urea with aqueous formaldehyde under mildly alkaline conditions, acidifying the mixture to cause formation of the condensation product and then further reacting the product with sodium meta-bisulfite. The resulting product is water-dispersible and anionic in nature. Such resins are normally made available commercially as a water dispersion containing about 40 to 50% solids.

The anionic alkali metal ammonium lignin sulfonates are produced as a by-product of paper pulp production by the sulfite process. The lignin products recovered from the ammonia base sulfite pulping process have proven to be particularly useful as an anionic additive in the present invention. Such products are described in U.S. Patent No. 2,846,409 and are generally termed "ammonium lignin sulfonates." They are available commercially in both the ammonium and alkali metal salt form.

The exact composition of these materials is not known but they are thought to be polymeric in nature, and are known to include other components such as sugars.

An analysis of a typical lignin by-product from the ammonia base sulfite pulping of western hemlock is:

Constituent:                         Percent by weight
    Lignin sulfonic acids _____ 40–50
    Alkali-liberated ammonia _____ 1–5
    Reducing sugars—as glucose _____ 10–30
    Miscellaneous substances, trace to 30%.

The anionic bark phenolic acids are derived from coniferous tree bark by extraction. The bark, in comminuted form, is placed in an extraction vessel and a solution of an alkali metal hydroxide is heated and passed over the bark to extract the phenolic constituents in water-soluble salt form. The extraction liquor is then dried to recover the soluble material. The bark phenolic acids differ from the lignin sulfonates in that they are produced by alkaline extraction whereas the lignin sulfonates are obtained from an acid medium. They further differ in that the bark phenolic acid extracts do not contain appreciable amounts of reducing sugars. A typical analysis of bark phenolic acids is as follows:

| | |
|---|---|
| pH (10% aqueous solution) | 9.8 |
| Na (percent) percent | 10–11 |
| Reducing sugars do | <1 |
| Water solubility (at 25°C.) do | 99+ |
| Viscosity at 25°C. (10% solids solution) centipoise | 6 |

Sodium salts of bark phenolic acids are available commercially from several companies engaged in the forest products business. The potassium and lithium salts are the full equivalent of the sodium salts for the purpose of this invention.

In practicing the process a slurry is first formed by suspending cellulosic fibers in water. The cationic resin is next added in an amount up to about 2% of resin solids based on the dry weight of the fiber, and the slurry is stirred to obtain resin distribution. After a brief contact time has elapsed the anionic material is added, preferably in water solution, in an amount between about 0.05% and about 2% based on the dry weight of the fiber, and preferably in an amount between about 0.05% and about 0.2% based on the dry weight of the fiber. In general the larger amounts are used when more than 1% of the cationic resin is used. The optimum amount to be used will depend to a considerable extent on the exact anionic and cationic materials employed and on the degree of wet strength desired. Further mixing then takes place and a second brief contact time is allowed. The sheet is then formed and dried at elevated temperature during which time the resin is at least partially cured. Complete curing of the resin need not take place during sheet drying, but may continue in the paper rolls.

In the commercial manufacture of wet strengthened paper the additives may be introduced in the furnish at a number of different points in the system. The cationic resin may, for example, be added at the end of the beater or hydropulper cycle, at the stock chest, at the consistency regulator, or at the individual machine chest. The anionic material may be added at the same points in the system and, in addition, may be added at the fan pump.

Regardless of where the cationic additive is mixed into the furnish, the anionic material must be added after the cationic material. For example, if the cationic resin is added at the end of the beater cycle, the anionic material may be added at the same point after the cationic material is thoroughly dispersed; however, it would be preferred to add the anionic material at the stock chest, consistency regulator, machine chest, or at the fan pump. If the cationic resin were added at the consistency regulator it would be necessary to add the anionic material at the machine chest or fan pump or other point following the consistency regulator in the system. If the anionic material is added first to the fiber slurry it will be necessary to add substantially more cationic resin than is required in the process of the invention to achieve the same amount of wet strength improvement.

In general, it is not desirable to add either material at the head box because sheet formation takes place so rapidly thereafter that some loss of additives may occur in the white water.

When wet strengthened paper is formed as described, its actual wet strength will be higher than when the same amount of cationic resin, in proportion to the dry fiber, is used without the addition of the anionic substance.

The following examples illustrate the invention in several of its forms. In all of the examples which follow, the proportions are expressed in parts by weight and the percentages are by weight.

The following examples illustrate the preparation of cationic and anionic material:

EXAMPLE I

A cationic, urea-formaldehyde wet strength resin was prepared.

The following materials were placed in a suitable resin-making kettle in the order shown. The kettle was equipped with an agitator, reflux condenser, and heating and cooling facilities.

| Material: | Parts by weight |
|---|---|
| Formaldehyde solution (46.5% HCHO) | 920.9 |
| Water | 236.3 |
| Triethylene tetramine | 1 |
| Urea | 356.8 |

The materials were stirred and simultaneously heated to 80° C. in 45 minutes. The temperature was then maintained at 80° C. for 20 minutes. Thereafter, there were added:

| Material: | Parts by weight |
|---|---|
| Water | 85.4 |
| Triethylene tetramine | 59.8 |
| Hydrochloric acid (37% HCl) | 44.3 |

The temperature was raised to 100° C. and remained there until the viscosity of the solution (measured after withdrawing a small sample and cooling it rapidly to 25° C.) at 25° C. was 140 centistokes. There were then added:

| | |
|---|---|
| Sodium hydroxide (50% water solution) | 16.0 |
| Water | 54.8 |

The resin solution was then cooled rapidly to 40° C., the pH adjusted to 7.3 by addition of a small portion of hydrochloric acid, and then 217 parts of water were added.

The finished resin had the following constants:

| | |
|---|---|
| Solids content percent | 36.4 |
| Viscosity at 25° C. centistokes | 80 |
| Specific gravity at 25° C./25° C. | 1.149 |
| pH | 7.5 |

EXAMPLE II

A resin was prepared according to Example I of U.S. Patent 2,926,154 by first reacting 2.0 moles of adipic acid with 2.18 moles of diethylene triamine to form a water-soluble polyamide type resin. This resin was then reacted with epichlorohydrin in strict accordance with the description in Example I of said patent to produce a water-soluble, cationic, polyamide type resin having a solids content of 9.3%.

EXAMPLE III

An anionic, sulfonated urea-formaldehyde resin was prepared.

Into a suitable resin-making kettle equipped with an agitator, a cooling and heating jacket, a reflux condenser, and a thermometer, was placed 64.97 parts by weight of a 37% strength formaldehyde solution which contained approximately 7% methanol. Next 0.89 part by weight of water were added. Sufficient 20% sodium carbonate solution was then added to adjust the pH to 9.0–9.5. Then 20.90 parts by weight of urea were added.

The mixture was heated to 90° C. in 60 minutes, during which time the pH was maintained above 7.2 by addition of sodium carbonate solution as needed.

The temperature was maintained at 90° C. for 10 minutes, and then sufficient 50% formic acid solution was added to reduce the pH to 3.8–4.0. The reaction was continued at 90° C. until the viscosity of the solution was 550 centistokes when measured at 25° C. Five minutes thereafter sufficient sodium carbonate solution was added to raise the pH to 7.0–8.0.

A slurry of 3.31 parts by weight of sodium metabisulfite and 3.31 parts by weight of hot water was then added and the resin was heated under reflux conditions until its critical solution temperature [1] dropped to 10° C. The resin was then cooled as rapidly as possible to 20°–25° C. during which time the pH was adjusted to 8.5 by addition of sodium carbonate or formic acid solution as required.

The resin constants then were:

| | |
|---|---|
| Solids content _____percent__ | 47 |
| Specific gravity 25°/25° C. _____ | 1.247 |
| pH _____ | 8.5 |
| Viscosity at 25° C. _____centistokes__ | 112 |
| Critical solution temperature [1] _____ | Below 8° C. |

[1] The critical solution temperature is measured by diluting sufficient resin with water to provide a 10% solids solution. This solution is then cooled while stirring by immersion in an ice-salt mixture. The temperature at which the solution suddenly shows a dense cloudiness of precipitated resin is termed the critical solution temperature.

EXAMPLE IV

An ammonium salt of fumarated unsaturated soybean oil was prepared.

Into a suitable resin-making kettle was placed 434 gr. of soybean oil. Nitrogen was used to sweep air from the flask and then a slight positive nitrogen pressure was maintained over the reactants to provide an inert atmosphere.

The oil was heated to 200° C. and 232 gr. of fumaric acid were added gradually while stirring. The temperature was raised to 220° C. and held until an acid number of 114.6 was obtained. The product was then cooled.

The product was made water-soluble by reaction with an alkali metal hydroxide or ammonium hydroxide as follows:

Into a suitable reaction vessel, equipped with an agitator, was placed 106.7 parts of water and 23.3 parts of 28% strength ammonium hydroxide. The mixture was warmed to about 25° C. and 70 parts of the fumarated soybean oil were added slowly while agitating the mixture. The temperature rose to about 40° C. from exothermic reaction. The mixing was continued for 30 minues whereupon the temperature was reduced to 25° C. and the reaction product recovered for use. The final product had a viscosity at 25° C. of 70 centistokes and a pH of 10.2.

EXAMPLE V

In an analogous manner the sodium salt of fumarated unsaturated soybean oil was prepared by reacting 100 parts of the fumarated oil of Example IV with 8.8 parts of sodium hydroxide in the presence of 191 parts of water. Heating at 60° C. was continued for fifteen minutes. The final product had a viscosity at 25° C. of 61 centistokes and a pH of 8.5.

In the following examples, both control and treated hand sheets were prepared in order to show the improved wet strength characteristics imparted to the paper through the use of the present invention. A standardized procedure for the preparation and testing of hand sheets was used in each of the examples. This method is as follows:

A bleached western softwood sulfite pulp was mixed with water to a consistency of 1.5% and beaten to Canadian standard freeness of 430 to 450 ml.

After beating the slurry was diluted to 0.41% consistency and divided into 500-ml. aliquots. Each aliquot then contained 2.07 gr. of fiber on an oven-dry basis.

Cationic resin solutions were prepared by diluting the resin with water until the resin solids content of 10 ml. of the solution was equal to 0.5% of the oven-dry fiber weight in a 500-ml. aliquot of pulp slurry. Anion resin solutions were prepared by diluting the anion resins to a point at which the solids content in 10 ml. of the solution was equal to 0.2% of the oven-dry weight of the fiber in a 500-ml. aliquot of pulp slurry.

The slurries to which cationic urea-formaldehyde resin was added were adjusted to a pH of 4.8 prior to the addition of the resin.

In control samples only one additive was added. In these samples the slurry was stirred while 10 ml. of the additive were added over a period of 10 seconds. Stirring was continued for an additional 20 seconds and the slurry was then allowed to stand for 15 seconds before being placed in the sheet mold.

In the examples in which both additives were added to the slurry, the slurry was stirred while 10 ml. of the cation resin were added over a period of 10 seconds. The slurry was then stirred for an additional 20 seconds. Stirring was continued while 10 ml. of the anion were added over a period of 10 seconds. Again, stirring continued for an additional 20 seconds. The slurry was then allowed to stand for 15 seconds and then placed in the sheet mold.

In all instances the hand sheet was formed as described in Technical Association of the Pulp & Paper Industry (TAPPI) Method No. T–205–m–58.

After air drying, the sheets were subjected to a heating cycle of 30 seconds in an infrared oven to approximate the "off machine" conditions found in most paper mills.

Dry tensile strengths were determined generally in accordance with TAPPI Method T–404–os–61. In brief, the dry tensile strength test was conducted by first cutting the sample paper strip accurately to a width of 0.5 in. and a length of 3 in. This strip was then broken in a suitable tensile test machine using a gap between the grips of about 2 in. In all instances, the tensile strengths are the average of several tests and are reported as pounds breaking strength per inch of paper width.

The wet tensile strengths were determined generally in accordance with TAPPI Method T–456–m–49. This test was similar to the dry tensile strength test but the paper test strip was fully saturated with water before breaking in the tensile tester.

The portions of the sheets not tested for "off machine" conditions were heated for 20 minutes at 105° C. in a forced air circulating oven to approxiamte the natural aging of the paper after it is rolled and stored. This is termed "total cure." The dry and wet tensile strengths of this paper were determined in the manner described above.

Partially polymerized polyamide base resin

A pulp slurry was prepared and divided into a number of aliquots as described above. These aliquots were used for the following examples:

EXAMPLE VI

A control sheet having no additives was prepared. Its "off machine" dry tensile strength was 22.2 lbs./in. and its "total cure" dry tensile strength was 24.2 lbs./in. Its "off machine" wet tensile strength was 0.55 lbs./in. and its "total cure" wet tensile strength was 0.47 lbs./in.

EXAMPLE VII

A control sheet incorporating the partially polymerized polyamide base resin of Example II was prepared. Its "off machine" dry tensile strength was 24.2 lbs./in. and its "total cure" dry tensile strength was 26.4 lbs./in. Its "off machine" wet tensile strength was 3.95 lbs./in., an increase of 3.40 lbs./in., and its "total cure" wet tensile strength was 4.95 lbs./in., an increase of 4.48 lbs./in.

EXAMPLE VIII

A control sheet incorporating the anion of Example III was prepared. Its "off machine" dry tensile strength was 22.6 lbs./in. and its "total cure" dry tensile strength was 24.2 lbs./in. Its "off machine" wet tensile strength was 0.60 lb./in., an increase of 0.05 lb./in., and its "total cure" wet tensile strength was 0.52 lb./in., an increase of 0.05 lb./in.

EXAMPLE IX

A sheet incorporating the cation of Example II and the anion of Example III was prepared. Its "off machine" dry tensile strength was 25.2 lbs./in. and "total cure" dry tensile strength was 27.2 lbs./in. Its "off machine" wet tensile strength was 4.47 lbs./in., an increase of 3.92 lbs./in., and its "total cure" wet tensile strength was 5.52 lbs./in., an increase of 5.05 lbs./in. A comparison of the increase of the "off machine" wet tensile strength in this example with the increase of the "off machine" wet tensile strength in Example VII indicates that the addition of the anion increased the "off machine" wet tensile strength 15.3%, and a comparison of the increase of the "total cure" wet tensile strength in this example with the increase of the "total cure" wet tensile strength in Example VII indicates that the addition of the anion increased the "total cure" wet tensile strength 12.7%. A comparison of the increase of the "off machine" and "total cure" wet tensile strengths of this example with the sum of the corresponding increase of the "off machine" and "total cure" wet tensile strengths of Examples VII and VIII indicates that the increase in wet tensile strengths in this example was not merely additive but was synergistic.

EXAMPLE X

A control sheet incorporating the anion of Example IV was prepared. The "off machine" dry tensile strength was 21.4 lbs./in. and a "total cure" dry tensile strength was 23.4 lbs./in. The "off machine" wet tensile strength was 0.66 lb./in., an increase of 0.11 lb./in., and the "total cure" wet tensile strength was 0.51 lb./in., an increase of 0.04 lb./in.

EXAMPLE XI

A sheet incorporating the cation of Example II and the anion of Example IV was prepared. The "off machine" dry tensile strength was 23.8 lbs./in. and the "total cure" dry tensile strength of the sheet was 24.6 lbs./in. The "off machine" wet tensile strength was 4.85 lbs./in., an increase of 4.30 lbs./in., and the "total cure" wet tensile strength was 5.71 lbs./in., an increase of 5.24 lbs./in. A comparison of the increase of the "off machine" wet tensile strength in this example with the increase of the "off machine" wet tensile strength in Example VII indicates that the addition of the anion increased the "off machine" wet tensile strength 26.5%, and a comparison of the increase of the "total cure" wet tensile strength in this example with the increase of the "total cure" wet tensile strength in Example VII indicates that the addition of the anion increased the "total cure" wet tensile strength 17.0%. A comparison of the increase of the "off machine" and "total cure" wet tensile strengths of this example with the sum of the corresponding increase of the "off machine" and "total cure" wet tensile strengths of Examples VII and X indicates that the increase in wet tensile strengths in this example was not merely additive but was synergistic.

EXAMPLE XII

A control sheet incorporating the anion of Example V was prepared. This paper had an "off machine" dry tensile strength of 22.4 lbs./in. and a "total cure" dry tensile strength of 24.4 lbs./in. It had an "off machine" wet tensile strength of 0.66 lb./in., an increase of 0.11 lb./in. and a "total cure" wet tensile strength of 0.46 lb./in., a decrease of 0.01 lb./in.

EXAMPLE XIII

A sheet incorporating the cation of Example II and the anion of Example V was prepared. This paper had an "off machine" dry tensile strength of 25.8 lbs./in. and a "total cure" dry tensile strength of 25.6 lbs./in. It had an "off machine" wet tensile strength of 5.15 lbs./in., an increase of 4.60 lbs./in., and a "total cure" wet tensile strength of 5.81 lbs./in., an increase of 5.74 lbs./in. A comparison of the increase of the "off machine" wet tensile strength in this example with the increase of the "off machine" wet tensile strength in Example VII indicates that the addition of the anion increased the "off machine" wet tensile strength 35.2%, and a comparison of the increase of the "total cure" wet tensile strength in this example with the increase of the "total cure" wet tensile strength in Example VII indicates that the addition of the anion increased the "total cure" wet tensile strength 28.1%. A comparison of the increase of the "off machine" and "total cure" wet tensile strengths of this example with the sum of the corresponding increase of the "off machine" and "total cure" wet tensile strengths of Examples VII and XII indicates that the increase in wet tensile strengths in this example was not merely additive but was synergistic.

EXAMPLE XIV

A control sheet incorporating the anionic sodium salts of the bark phenolic acids was prepared. The sheet had an "off machine" dry tensile strength of 24.0 lbs./in., and a "total cure" dry tensile strength of 24.6 lbs./in. It had an "off machine" wet tensile strength of 0.62 lb./in., an increase of 0.07 lb./in., and a "total cure" wet tensile strength of 0.45 lb./in., a decrease of 0.02 lb./in.

EXAMPLE XV

A sheet incorporating the cation of Example II and the anionic sodium salt of bark phenolic acids was prepared. This paper had an "off machine" dry tensile strength of 25.0 lbs./in. and a "total cure" dry tensile strength of 26.4 lbs./in. It had an "off machine" wet tensile strength of 4.23 lbs./in., an increase of 3.68 lbs./in., and a "total cure" wet tensile strength of 5.27 lbs./in., an increase of 4.80 lbs./in. A comparison of the increase of the "off machine" wet tensile strength in this example with the increase of the "off machine" wet tensile strength in Example VII indicates that the addition of the anion increased the "off machine" wet tensile strength 8.2%, and a comparison of the increase of the "total cure" wet tensile strength in this example with the increase of the "total cure" wet tensile strength in Example VII indicates that the addition of the anion increased the "total cure" wet tensile strength 7.1%. A comparison of the increase of the "off machine" and "total cure" wet tensile strengths of this example with the sum of the corresponding increase of the "off machine" and "total cure" wet tensile strengths of Examples VII and XIV indicates that the increase in wet tensile strengths in this example was not merely additive but was synergistic.

Polyamine modified urea wet strength resin

A pulp slurry was prepared as set forth above and divided into aliquots.

EXAMPLE XVI

A control sheet having no additives was prepared. This had an "off machine" dry tensile strength of 25.6 lbs./in. and a "total cure" dry tensile strength of 25.0 lbs./in. It had an "off machine" wet tensile strength of 0.86 lb./in. and a "total cure" wet tensile strength of 0.88 lb./in.

EXAMPLE XVII

A control sheet incorporating the cation of Example I was prepared. This had an "off machine" dry tensile strength of 26.0 lbs./in. and a "total cure" dry tensile strength of 25.8 lbs./in. It had an "off machine" wet tensile strength of 2.69 lbs./in., an increase of 1.83 lbs./in., and a "total cure" wet tensile strength of 3.84 lbs./in., an increase of 2.96 lbs./in.

EXAMPLE XVIII

A control sheet incorporating the anion of Example III was prepared. This had both an "off machine" and a "total cure" dry tensile strength of 25.8 lbs./in. It had an "off machine" wet tensile strength of 0.86 lb./in., showing no increase, and a "total cure" wet tensile strength of 0.89 lb./in., an increase of 0.01 lb./in.

EXAMPLE XIX

A sheet incorporating the cation of Example I and the anion of Example III was prepared. This had both an "off machine" and a "total cure" dry tensile strength of 26.6 lbs./in. It had an "off machine" wet tensile strength of 2.94 lbs./in., an increase of 2.08 lbs./in., and a "total cure" wet tensile strength of 4.15 lbs./in., an increase of 3.27 lbs./in. A comparison of the increase of the "off machine" wet tensile strength in this example with the increase of the "off machine" wet tensile strength in Example XVII indicates that the addition of the anion increased the "off machine" wet tensile strength 13.7%, and a comparison of the increase of the "total cure" wet tensile strength in this example with the increase of the "total cure" wet tensile strength in Example XVII indicates that the addition of the anion increased the "total cure" wet tensile strength 10.5%. A comparison of the increase of the "off machine" and "total cure" wet tensile strengths of this example with the sum of the corresponding increase of the "off machine" and "total cure" wet tensile strengths of Examples XVII and XVIII indicates that the increase in wet tensile strengths in this example was not merely additive but was synergistic.

EXAMPLE XX

A control sheet incorporating the anion of Example IV was prepared. This had an "off machine" dry tensile strength of 23.9 lbs./in. and a "total cure" dry tensile strength of 24.6 lbs./in. It had an "off machine" wet tensile strength of 0.84 lb./in., a decrease of 0.02 lb./in., and a "total cure" wet tensile strength of 0.88 lb./in., indicating no change.

EXAMPLE XXI

A sheet incorporating the cation of Example I and the anion of Example IV was prepared. This had an "off machine" dry tensile strength of 24.8 lbs./in. and a "total cure" dry tensile strength of 25.4 lbs./in. It had an "off machine" wet tensile strength of 2.90 lbs./in., an increase of 2.04 lbs./in., and a "total cure" of 3.98 lbs./in., an increase of 3.10 lbs./in. A comparison of the increase of the "off machine" wet tensile strength in this example with the increase of the "off machine" wet tensile strength in Example XVII indicates that the addition of the anion increased the "off machine" wet tensile strength 11.5%, and a comparison of the increase of the "total cure" wet tensile strength in this example with the increase of the "total cure" wet tensile strength in Example XVII indicates that the addition of the anion increased the "total cure" wet tensile strength 4.7%. A comparison of the increase of the "off machine" and "total cure" wet tensile strengths of this example with the sum of the corresponding increase of the "off machine" and "total cure" wet tensile strengths of Examples XVII and XX indicates that the increase in wet tensile strengths in this example was not merely additive but was synergistic.

EXAMPLE XXII

A control sheet incorporating the anion of Example V was prepared. This had an "off machine" dry tensile strength of 25.4 lbs./in. and a "total cure" dry tensile strength of 25.0 lbs./in. It had an "off machine" wet tensile strength of 0.85 lb./in., a decrease of 0.01 lb./in., and a "total cure" wet tensile strength of 0.91 lb./in., an increase of 0.03 lb./in.

EXAMPLE XXIII

A sheet incorporating the cation of Example I and the anion of Example V was prepared. The sheet had an "off machine" dry tensile strength of 25.0 lbs./in. and a "total cure" dry tensile strength of 25.6 lbs./in. It had an "off machine" wet tensile strength of 3.24 lbs./in., an increase of 2.38 lbs./in., and a "total cure" wet tensile strength of 4.27 lbs./in., an increase of 3.39 lbs./in. A comparison of the increase of the "off machine" wet tensile strength in this example with the increase of the "off machine" wet tensile strength in Example XVII indicates that the addition of the anion increased the "off machine" wet tensile strength 30.1%, and a comparison of the increase of the "total cure" wet tensile strength in this example with the increase of the "total cure" wet tensile strength in Example XVII indicates that the addition of the anion increased the "total cure" wet tensile strength 14.5%. A comparison of the increase of the "off machine" and "total cure" wet tensile strengths of this example with the sum of the corresponding increase of the "off machine" and "total cure" wet tensile strengths of Examples XVII and XXII indicates that the increase in wet tensile strengths in this example was not merely additive but was synergistic.

EXAMPLE XXIV

A control sheet incorporating the anionic sodium salt of bark phenolic acids was prepared. This had an "off machine" dry tensile strength of 26.2 lbs./in. and a "total cure" dry tensile strength of 23.4 lbs./in. It had an "off machine" wet tensile strength of 0.79 lb./in., a decrease of 0.07 lb./in., and a "total cure" wet tensile strength of 0.89 lb./in., an increase of 0.01 lb./in.

EXAMPLE XXV

A sheet incorporating the cation of Example I and the anionic sodium salt of bark phenolic acids was prepared. This had an "off machine" dry tensile strength of 27.2 lbs./in. and a "total cure" dry tensile strength of 26.8 lbs./in. It had an "off machine" wet tensile strength of 2.92 lbs./in., an increase of 2.06 lbs./in., and a "total cure" wet tensile strength of 4.07 lbs./in., an increase of 3.19 lbs./in. A comparison of the increase of the "off machine" wet tensile strength in this example with the increase of the "off machine" wet tensile strength in Example XVII indicates that the addition of the anion increased the "off machine" wet tensile strength 18.0%, and a comparison of the increase of the "total cure" wet tensile strength in this example with the increase of the "total cure" wet tensile strength in Example XVII indicates that the addition of the anion increased the "total cure" wet tensile strength 7.8%. A comparison of the increase of the "off machine" and "total cure" wet tensile strengths of this example with the sum of the corresponding increase of the "off machine" and "total cure" wet tensile strengths of Examples XVII and XXIV indicates that the increase in wet tensile strengths in this example was not merely additive but was synergistic.

The following examples will illustrate the usefulness of alkali metal, preferably sodium, and ammonium lignin sulfonates derived as a by-product of the ammonia base pulping of wood as an anion in the present invention.

EXAMPLE XXVI

A polyalkylene polyamine modified urea-formaldehyde cation resin was prepared in a manner analogous to that of Example I. However, a mixture of triethylene tetramine and diethylene triamine was used as a modifier. The final resin had a solids content of 27.5% and a viscosity of 60 centistokes at 25° C. and a pH of 6.7. The resin was diluted with water to a point at which 10 ml. of the solution had a resin solids content that was equal to 0.5% of the weight of the pulp fiber in a 500-ml. aliquot.

EXAMPLE XXVII

An aliphatic polyamide base cation resin partially reacted with epichlorohydrin was prepared in a manner analogous to Example II. The base resin was formed by reacting one mole of adipic acid with one mole of diethylene triamine. 1.25 moles of epichlorohydrin per mole of secondary nitrogen was then used to partially cross-link the base polyamide. The final resin contained 25% resin solids and had a viscosity of 57 centistokes at 25° C. The resin was diluted with water to a point at which 10 ml. of the solution contained resin solids having a weight equal to 0.5% of the weight of the pulp fiber in a 500-ml. aliquot.

The procedure in this series of examples was the same as that described previously.

EXAMPLE XXVIII

A control sheet incorporating 20 ml. of the cation resin solution of Example XXVI in the slurry was prepared. The sheet had an "off machine" dry tensile strength of 26.3 lbs./in. and a "total cure" dry tensile strength of 32.2 lbs./in. It had an "off machine" wet tensile strength of 2.45 lbs./in. and a "total cure" wet tensile strength of 5.23 lbs./in.

EXAMPLE XXIX

A control sheet incorporating 5 ml. of the cation resin solution of Example XXVII in the slurry was prepared. The sheet had an "off machine" dry tensile strength of 24.9 lbs./in. and a "total cure" dry tensile strength of 25.2 lbs./in. It had an "off machine" wet tensile strength of 2.40 lbs./in. and a "total cure" wet tensile strength of 5.19 lbs./in.

EXAMPLE XXX

A control sheet incorporating 10 ml. of the cation resin solution of Example XXVII in the slurry was prepared. The sheet had an "off machine" dry tensile strength of 24.1 lbs./in. and a "total cure" dry tensile strength of 25.5 lbs./in. It had an "off machine" wet tensile strength of 3.00 lbs./in. and a "total cure" wet tensile strength of 6.94 lbs./in.

EXAMPLE XXXI

A control sheet incorporating ammonium lignin sulfonate was prepared. The anion added to the pulp slurry had a weight equal to 0.5% of the weight of the fibers in the slurry. The sheet had an "off machine" dry tensile strength of 26.8 lbs./in. and an "off machine" wet tensile strength of 0.57 lb./in.

EXAMPLE XXXII

A control sheet incorporating sodium lignin sulfonate was prepared. The anion added to the pulp slurry had a resin solids weight equal to 0.5% of the weight of the fibers in the slurry. The sheet had an "off machine" dry tensile strength of 25.2 lbs./in. and a "total cure" dry tensile strength of 26.3 lbs./in. It had an "off machine" wet tensile strength of 0.46 lb./in. and a "total cure" of 0.90 lb./in.

EXAMPLE XXXIII

A sheet incorporating both the cation of Example XXVI and ammonium lignin sulfonate was prepared. The cation added to the pulp slurry had a resin solids weight equal to 1% of the weight of the fibers in the slurry, and the ammonium lignin sulfonate added to the slurry had a resin solids weight of 0.1% of the weight of the fibers in the slurry. The sheet had an "off machine" dry tensile strength of 25.6 lbs./in. and a "total cure" dry tensile strength of 32.0 lbs./in. It had an "off machine" wet tensile strength of 3.36 lbs./in. and a "total cure" wet tensile strength of 5.26 lbs./in.

EXAMPLE XXXIV

A sheet incorporating the cation of Example XXVII and ammonium lignin sulfonate was prepared. The cation added had a resin solids weight equal to 0.5% of the weight of the pulp fiber in the slurry, and the ammonium lignin sulfonate had a solids weight equal to 0.1% of the weight of the pulp fiber in the slurry. The sheet had an "off machine" dry tensile strength of 28.1 lbs./in. and a "total cure" dry tensile strength of 31.6 lbs./in. It had an "off machine" wet tensile strength of 3.86 lbs./in. and a "total cure" wet tensile strength of 8.57 lbs./in.

EXAMPLE XXXV

A sheet incorporating the cation of Example XXVII and sodium lignin sulfonate was prepared. The cation had a weight equal to 0.25% of the weight of the pulp fiber in the slurry, and the anion had a weight equal to 0.1% of the weight of the fiber in the slurry. The sheet had an "off machine" dry tensile strength of 25.8 lbs./in. and a "total cure" dry tensile strength of 29.6 lbs./in. It had an "off machine" wet tensile strength of 2.46 lbs./in. and a "total cure" wet tensile strength of 5.98 lbs./in.

It can be seen that the present invention provides a process for increasing the wet strength of paper by adding certain anionic materials to the paper furnish after certain cationic wet strength resins are dispersed therein.

What is claimed is:

1. A method of increasing the wet strength of paper comprising
    forming a suspension of paper-making fibers in water;
    adding to said suspension in an amount up to about 2% of resin solids based on the dry fiber weight a water soluble, cationic, thermosetting polyalkylene polyamine modified urea-formaldehyde resin;
    thereafter adding to said suspension in an amount between about 0.05% and about 2% based on the dry fiber weight an alkali metal salt of fumarated, unsaturated oil;
    forming said fibers into a paper sheet; and
    drying said sheet at elevated temperature to at least partially cure said cationic resin.

2. A method of increasing the wet strength of paper comprising
    forming a suspension of paper-making fibers in water;
    dispersing in said suspension in an amount up to about 2% of resin solids based on the dry fiber weight a water-soluble, cationic, thermosetting aliphatic polyamide base resin partially reacted with a polyfunctional cross-linking agent;
    adding to said suspension in an amount between about 0.05% and about 2% based on the dry fiber weight an alkali metal salt of fumarated, unsaturated oil;
    forming said fibers into a paper sheet; and
    drying said sheet at elevated temperature to at least partially cure said cationic resin.

3. A method of increasing the wet strength of paper comprising
    forming a suspension of paper-making fibers in water;
    dispersing in said suspension in an amount up to about 2% of resin solids based on the dry fiber weight an aliphatic polyamide base resin partially reacted with a polyfunctional cross-linking agent;
    adding to said suspension in an amount between about 0.05% and about 2% based on the dry fiber weight an ammonium salt of a fumarated, unsaturated oil;
    forming said fibers into a paper sheet; and
    drying said sheet at elevated temperature to at least partially cure said cationic resin.

References Cited

UNITED STATES PATENTS

| | | | |
|---|---|---|---|
| 3,350,261 | 10/1967 | Roberts et al. | 162—163 |
| 3,180,787 | 4/1965 | Adams | 162—163 |
| 3,236,720 | 2/1966 | Tousignant et al. | 162—163 |

S. LEON BASHORE, *Primary Examiner.*

U.S. Cl. X.R.

162—163, 166, 179, 182